United States Patent [19]
Corby, Jr.

[11] Patent Number: 5,831,735
[45] Date of Patent: Nov. 3, 1998

[54] NON-CONTACT OPTICAL MEASUREMENT PROBE

[75] Inventor: Nelson Raymond Corby, Jr., Scotia, N.Y.

[73] Assignee: General Electric Company, Schenectady, N.Y.

[21] Appl. No.: 901,637

[22] Filed: Jul. 28, 1997

[51] Int. Cl.$^6$ .................................................. G01B 11/14
[52] U.S. Cl. ...................... 356/375; 356/376; 250/559.29
[58] Field of Search ................................... 356/375, 376; 250/559.29, 559.3

[56] References Cited

U.S. PATENT DOCUMENTS

| | | | |
|---|---|---|---|
| 5,216,235 | 6/1993 | Lin | 356/375 |
| 5,379,106 | 1/1995 | Baldur | 356/375 |
| 5,499,097 | 3/1996 | Ortyn et al. | 356/375 |

*Primary Examiner*—Frank G. Font
*Assistant Examiner*—Zandra V. Smith
*Attorney, Agent, or Firm*—Lawrence P. Zale; Marvin Snyder

[57] ABSTRACT

An Optical Probe Measurement Device accurately and efficiently measures locations of visible features of a structure without making contact with the structure. It employs a centering microscope which a user looks through to locate the feature to be measured. The centering microscope is connected to an orientation plate in a known pose which has targets measurable with a 3D measurement device. The 3D measurement device determines 3D locations of the targets. A light source is attached to the orientation plate to produce a light beam which intersects the optical axis at the focal point of the centering microscope, being a distance $D_0$ away from the end of the centering microscope. When this light beam impinges on the surface of the structure at the same location as the feature seen in the centering microscope, the feature is exactly the $D_0$ away from the centering microscope. A calculation device receives the measured 3D locations of the targets, the pose of the centering microscope relative to the orientation plate, and the distance $D_0$, and calculates the actual 3D location of the focal point, also being the location of the feature on the structure. Optionally a triggering device may be used to indicate when to calculate the location of the focal point.

6 Claims, 2 Drawing Sheets

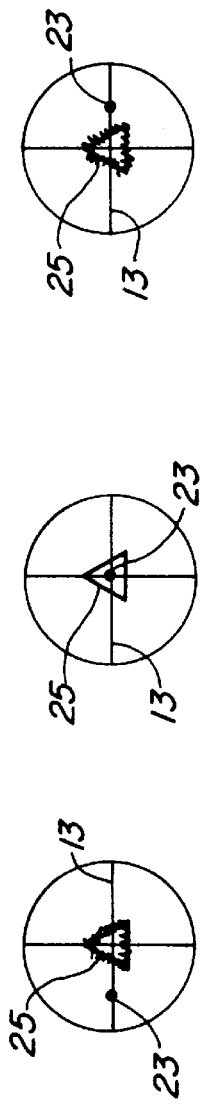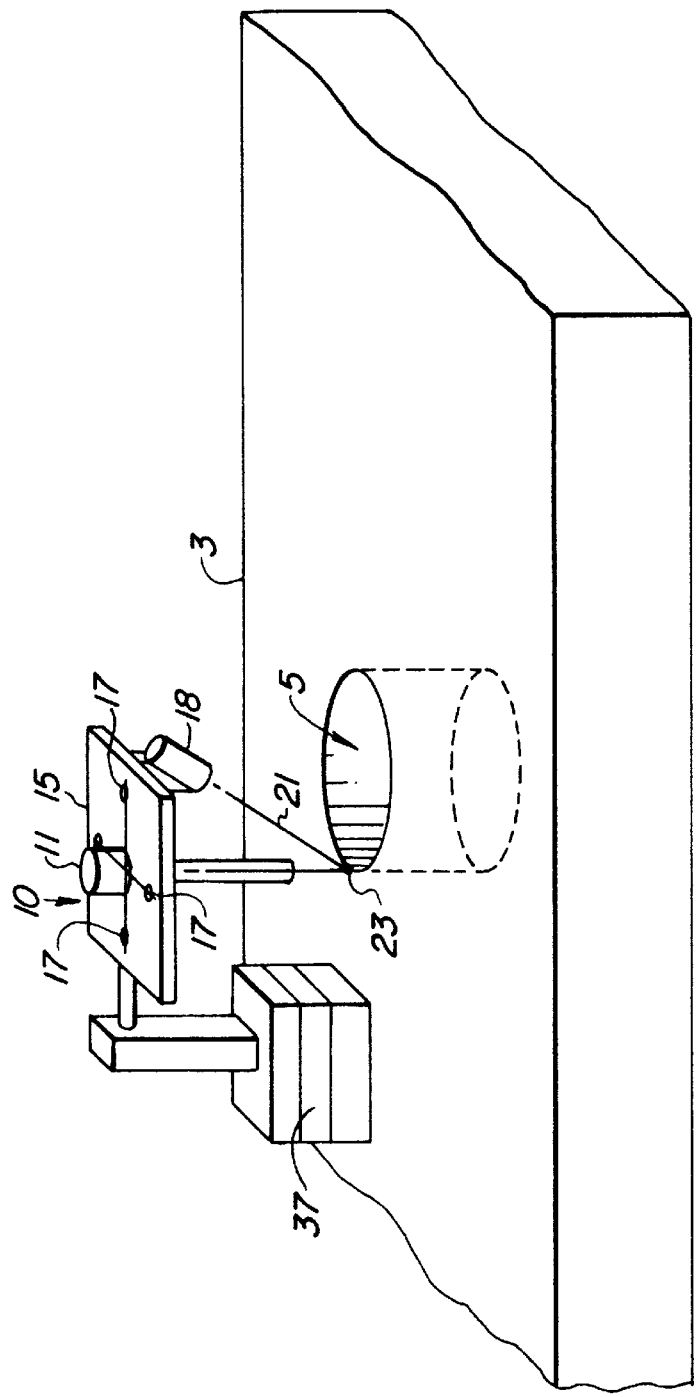

NON-CONTACT OPTICAL MEASUREMENT PROBE

BACKGROUND OF THE INVENTION

1. Field of the Invention

The present invention is related to accurate measurement of coordinates of features of objects.

2. Discussion of Prior Art

In many applications it is useful to accurately measure the locations of points on an object. For example, in manufacturing pieces of large, high-accuracy machinery, or creating parts to retrofit existing machinery, dimensions and tolerances are very critical.

One method of point measurement uses a coordinate measurement machine (CMM) to determine the coordinates of a point. Currently theodolite and tracking laser interferometers provide the ability to locate the three dimensional coordinates of the center of a target. For theodolite systems, the target is usually a small, thin disk with an optical target printed on top or a "stick-on" target with a optical pattern on it. Triangulation using two or more theodolites enables the center of the target to be found.

The tracking laser interferometer continuously tracks the position of a corner cube reflector (embedded in a 1.5 inch diameter sphere) in three dimensions and continuously supplies the 3D coordinate of the center of the precision sphere. For a 1.5 inch diameter sphere, there is a 0.75 inch offset of measured center from the surface of the sphere. In order to use the sphere to measure surface points, it is necessary to touch points in the neighborhood on the object surface with the sphere or to use additional fixtures to adapt the sphere to the measurement at hand. The selected fixture is then touched to a number of points on the object surface.

There is inherent error involved in touching the surface. Irregularities of the surface may cause error. The step of physically touching the object may cause it to move, requiring many measurements to be re-done. Also, the physical act of touching points to measure them becomes very time-intensive and tedious, since it is difficult to determine if the probe is exactly at the surface point to be measured.

Currently, there is a need for a device which efficiently and accurately measures locations on an object without the need for touching the object.

BRIEF DESCRIPTION OF THE DRAWINGS

While the novel features of the invention are et forth with particularly in the appended claims, the invention, both as to organization and content, will be better understood and appreciated, along with other objects and features thereof, from the following detailed description taken in conjunction with the drawings, in which:

FIGS. 2, 4 are illustrations simulating a view through optical measurement probe according to the present invention where the distance from the probe to the surface is different from the probes focal length.

FIG. 3 is an illustration simulating a view through optical measurement probe according to the present invention where the distance from the probe to the surface is equal to the probe's focal length.

FIG. 5 is a perspective view of the optical measurement probe according to the present invention, as it would appear in use measuring locations on an object.

SUMMARY OF THE INVENTION

Figure 1:
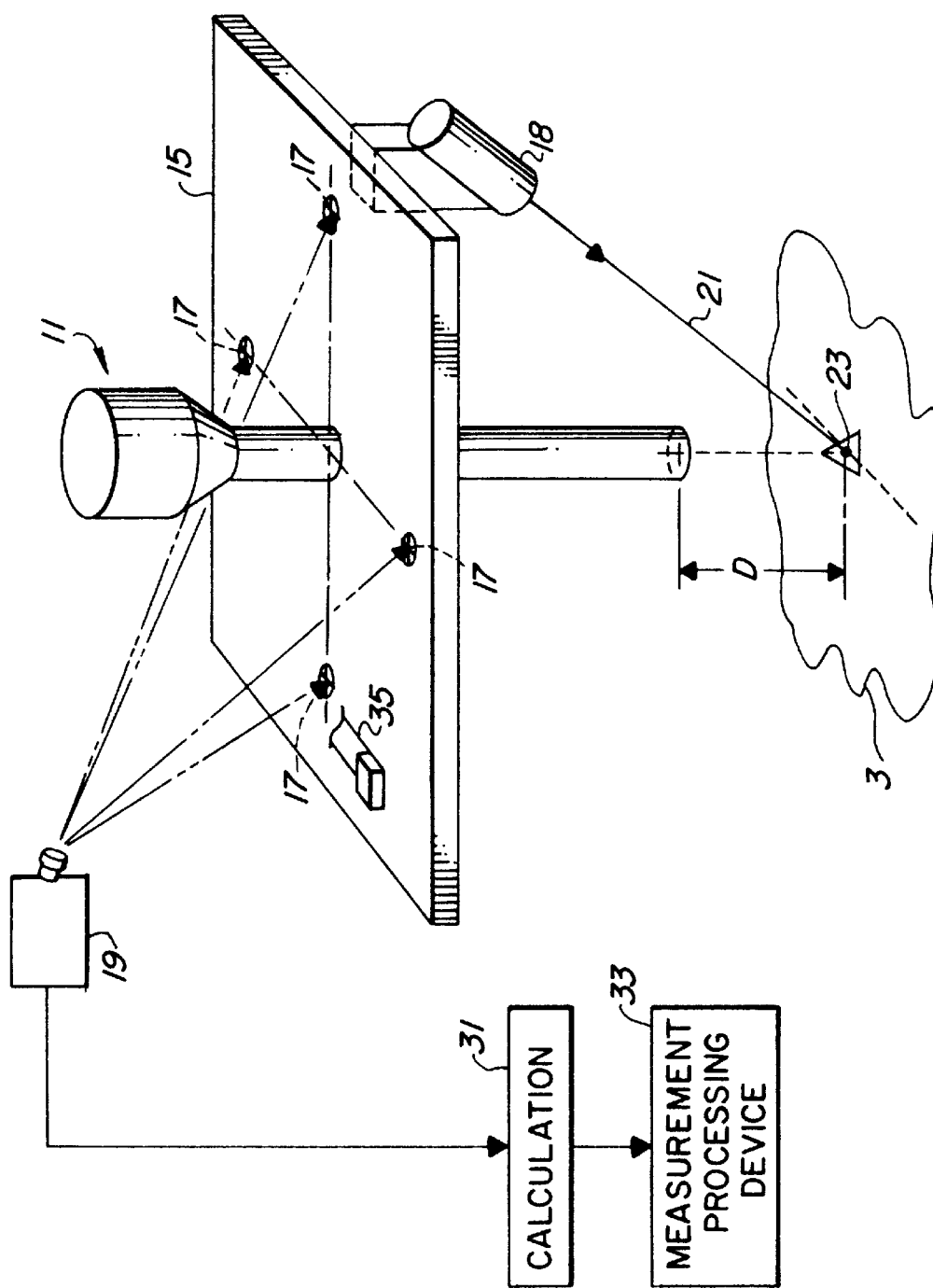
FIG. 1 is a simplified perspective view of the major components of the optical measurement probe according to the present invention.

A non-contact optical probe measurement system accurately measures a 3D location of a visible feature on a surface of a structure. It does this by causing an operator to position the 'optical measurement center' of the optical probe to be coincident with the 3D surface point to be measured. Optical means are provided to guide the operator to achieve this condition.

The 3D position and orientation ('pose') of the optical measurement center (with respect to the body of the probe) is known by construction or calibration.

Once the above spatial coincidence is established, the operator then uses a spatial measurement device (such as a coordinate measurement machine) to establish the position and orientation of the probe body in space. This is usually accomplished by measuring the 3D spatial coordinates of 3 or more points on the probe body.

The position of the optical measurement center can then be calculated from the measured probe body points using the calibration data or construction geometry.

The optical probe employs an optical system, such as a centering microscope having a elongated body with an eyepiece at one end which a user looks through, and the other end being an object end. It is machined accurately such that the optical axis is accurately coaxial with the center of its body.

The centering microscope produces a magnified image of structures pointed at, at the eyepiece by the centering microscope. It has a focal point a distance $D_0$ from its object end. Features at the focal point are in focus. This focal point is the optical measurement center of the probe.

An orientation plate is fixed to the centering microscope in a known relative pose having multiple landmarks at fixed locations on the orientation plate.

A light source is positioned at a pose with respect to orientation plate to produce a light beam angled to intersect the optical axis at the focal point $D_0$. This arrangement also produces a probe spot where the beam strikes the surface.

A 3D measurement device, which may be an optical coordinate measurement device (CMM), measures the 3D location of the fixed landmarks on the orientation plate.

A calculation device is preset with a transformation matrix to convert measured positions of objects into a set of 3D coordinates of probe spot. These values may be manually input, or provided by a calibration routine within unit.

Calculation device, receives the measured 3D locations of the landmarks from the 3D measurement device and calculates the 3D location of the focal point $D_0$.

A measurement processing device receives the 3D location of the focal point $D_0$, from the calculation device, and utilizes this 3D location to create a CAD description of said structure.

OBJECTS OF THE INVENTION

An object of the present invention is to provide a device which accurately measures locations on an object without the need for touching the object.

Another object of the present invention is to provide a device which more efficiently measures locations on an object than previously possible.

DETAILED DESCRIPTION OF THE INVENTION

The present invention is an efficient and accurate device used for measurement of locations. It will be described as measuring in three dimensions (3D), however, may also be used for 2D and 1D measurements.

The present invention is particularly applicable in manufacture and maintenance of industrial machinery, such as turbines and generators, which large structures are operated at high speeds, requiring exact tolerances. A small error may lead to significant problems over time.

FIG. 1 is a simplified perspective view of the major components of the optical measurement probe according to the present invention.

An optical measurement probe 10 is shown in simplified perspective view in FIG. 1. An optical microscope specifically manufactured to have an optical axis being highly coincident with its mechanical axis, and having a focal point lying on the optical axis precisely centered within the microscope tube, is known as a centering microscope 11.

A user looks through the eyepiece end of centering microscope 11 to a focal point being a distance $D_0$ from an object end of centering microscope 11.

An orientation plate 15 is attached to centering microscope 11 in a fixed pose relative to centering microscope 11. Most typically, centering microscope 11 would be perpendicular to orientation plate 15, however, it is not necessary.

A three dimensional (3D) measurement device 19 measures the distance to each of a plurality of targets 17 located on orientation plate 15. 3D measurement device 19 may be any conventional high-accuracy spatial measurement systems, such as a fixed CMM, a portable optical CMM or a portable mechanical touch probe type CMM (such as SMX and Leica for optical-type measurement systems, and Faro Technologies for mechanical touch probe type measurement systems). Targets 17 are of a type suitable for use with the 3D measurement system chosen (i.e. optical, touch probe, etc.). This allows 3D measurement device 19 to determine the location of each of these targets 17.

Since the orientation plate 15 and its targets 17 are in a fixed relationship to microscope 11, calibration data may be used to calculate the spatial position of probe spot 23 when the position of targets 17 have been measured.

Centering microscope 11 is designed to have a predetermined focal point a distance $D_0$ away from centering microscope 11.

In order to cause the operator to precisely place the optical measurement center at the surface point to be measured, the following items are provided.

Light source 18, which may be a laser diode or other light beam source, creates a narrow collimated beam 21. Light source 18 is mounted on orientation plate 15 at the time of manufacture in such a way that the light beam emitted by 18 intersects the optical axis of 11 at an angle, preferably of 20°–50° with respect to the optical axis of the centering microscope 11 and precisely intersects the optical axis of centering microscope 11 at its focal point. The focal point is located a distance $D_0$ measured with respect to the object end of centering microscope 11.

Therefore, when the surface of 3 is any distance D below the end of microscope 11 (as shown in FIG. 1) which is different from $D_0$, the beam of light source 18 will impinge surface 3 at a location which is not the same as that seen by centering microscope 11. In order to more accurately indicate the optical axis of centering microscope 11, a crosshair reticle 13 is used. When surface 3 is exactly the distance $D_0$ away from centering microscope 11, the beam 21 of light source 18 will impinge upon surface 3 at probe spot 23 seen by centering microscope 11 which appears to be directly in the middle of center reticle 13. Under this condition, the probe spot 23 produced by the intersection of beam 21 of surface 3 is exactly coincident with the focus of microscope 11.

FIGS. 2, 3, 4 are illustrations simulating a view through the optical measurement probe 10. When distance D from the probe to the surface 3 of an object being measured is greater than a focal length $D_0$ of centering microscope 11, a view as shown in FIG. 2 occurs. Feature 25 being viewed is out of focus and blurry. Probe spot 23 appears to the left of the center of the cross hair reticle 13. Feature 25 is not a target applied to the surface. Feature 25 is used here for illustration purposes only. During actual measurement, any visible feature of the surface (whose 3D coordinates are to be measured) may be used.

When distance D from the optical measurement probe 10 to the surface 3 of the object being measured is exactly equal $D_0$, a view looks like FIG. 3. Feature 25 is clear and in focus with probe spot 23 appearing in the center of reticle 13.

Similarly, when distance D from optical measurement probe 10 to the surface 3 of an object being measured is less than a focal length $D_0$ of centering microscope 11, a view as shown in FIG. 4 occurs. Feature 25, again, is out of focus and blurry. Probe spot 23 appears to the right of the center of the crosshair reticle 13.

In use, the operator selects the surface point of interest on surface 3. He then adjusts the pose of the probe 10 so as to end up with the selected measurement point being visible, focused and centered on the reticle 13 in image provided by the eyepiece of microscope 11. In addition, the probe spot 23 must also be precisely centered on the reticle 13. This is the condition depicted in FIG. 3. When these conditions are met, the optical measurement center of the probe 10 is guaranteed to be coincident with the surface point of interest.

At this point, the operator uses spatial measurement device 13 to measure the 3D coordinates of at least three targets 17. For 2D and 1D applications, a lesser number of targets are required. Device 31 (using calibration data or construction dimensions) calculates the 3D location of the optical measurement center from the 3D coordinates of targets 17.

A triggering device 35 is coupled to calculation device 31 such that an operator may operate triggering device 35 in order to cause the instantaneous pose, and ultimately, the instantaneous location of the focal point $D_0$ of centering microscope 11 to be measured.

The predetermined, or preset focal length, $D_0$, is provided to a calculation device 31 in some fashion, being either automatic or manual.

Calculation device 31 receives the locations of targets 17 from 3D measurement device 19 and performs the necessary calculations to determine the pose of orientation plate 15. It can then extrapolate the pose of centering microscope 11 and calculate a ray passing through centering microscope 11 to the surface, such as surface 3. Knowledge of $D_0$ enables device 31 to then calculate the position of the optical measurement center.

A measurement processing device 33 is coupled to calculation device 31 and performs any further calculation for use of the measurements obtained by calculation device 31.

FIG. 5 shows a perspective view of the present invention as it would appear in operation measuring locations of an object.

The present invention can be fixed to a base 37 which securely holds onto the object at a desired location. In one embodiment, optical measurement device 10 is attached to a magnetic base 37 and is shown measuring an edge point of a hole 5 on the object. Other means of removeably attaching base 37 to the object may also be employed. Elements 19, 31 and 33 of the present invention are not shown in FIG. 5 for the sake of clarity.

Device 10 is calibrated by causing probe spot 23 to be focused on a point target with known (x,y,z) coordinates, measured by 3D measurement device 19. When the optical probe is focused on the known point target, the position of targets 17 are measured by 3D measurement device 19. At least (3) such targets 17 are required to uniquely define the pose of optical probe 10.

A calculation device 31 receives the locations of targets 17, and determines a transformation matrix M, if not already predetermined, that converts (3) or more (x,y,z) coordinates of target 17 into an (x,y,z) coordinate of probe spot 23.

After calibration, calculation device 31 uses matrix M, and the coordinates of the (3) or more target points 17 to calculate the position of features indicated by probe point 23.

While specific embodiments of the invention have been illustrated and described herein, it is realized that modifications and changes will occur to those skilled in the art. It is, therefore, to be understood that the appended claims are intended to cover all such modifications and changes as fall within the true spirit and scope of the invention.

What is claimed is:

1. A non-contact measurement system for accurately measuring a 3D location of a visible feature on a surface of a structure comprising:
   a) a centering microscope having a elongated body with an eyepiece end and a object end, a reticle visible through the eyepiece end, the centering microscope machined to have an optical axis passing substantially through the center of the elongated body for producing an image at the eyepiece of structures pointed at by the object end which are in focus at a focal point a distance $D_0$ from the object end;
   b) an orientation plate attached to the centering microscope in a fixed relative position and orientation (pose) having visible landmarks at predefined locations on the orientation plate;
   c) a light source positioned at a pose with respect to orientation plate for producing a light beam angled to intersect the optical axis at the focal point $D_0$, and for producing a probe spot where it impinges on the surface of said object;
   d) a 3D measurement device for measuring the 3D location of the visible landmarks of the orientation plate;
   e) a calculation device being preset with the pose of the orientation plate and predefined location of the landmarks on orientation plate with reference to the centering microscope, coupled to the 3D measurement device, for receiving the measured 3D locations of the landmarks, and for calculating the 3D location of the focal point $D_0$;
   f) a measurement processing device coupled to the calculation device for receiving the 3D location of the focal point $D_0$, and for utilizing this 3D location in a computer-generated representation of said structure.

2. The non-contact measurement system of claim 1, further comprising: a triggering device coupled to the calculation device for indicating to the calculation device when to use the 3D locations form the 3D measurement device to calculate the 3D location of focal point $D_0$.

3. The non-contact measurement system of claim 1, wherein the 3D measurement machine comprises:
   a coordinate measurement machine (CMM); and the visible landmarks comprise:
   CMM targets corresponding to the particular CMM being used and attached to the orientation plate at predefined locations.

4. The non-contact measurement system of claim 3, wherein the CMM employs optical spatial measurement techniques to measure CMM target positions.

5. The non-contact measurement system of claim 3, wherein the CMM is a 'touch probe' type of CMM.

6. The non-contact measurement system of claim 1 wherein the reticle is a crosshair reticle.

* * * * *